(12) United States Patent
Czaplicki et al.

(10) Patent No.: US 7,105,112 B2
(45) Date of Patent: Sep. 12, 2006

(54) LIGHTWEIGHT MEMBER FOR REINFORCING, SEALING OR BAFFLING

(75) Inventors: Michael J. Czaplicki, Rochester, MI (US); David Carlson, Rochester Hills, MI (US)

(73) Assignee: L&L Products, Inc., Romeo, MI (US)

( * ) Notice: Subject to any disclaimer, the term of this patent is extended or adjusted under 35 U.S.C. 154(b) by 355 days.

(21) Appl. No.: 10/686,845

(22) Filed: Oct. 16, 2003

(65) Prior Publication Data
US 2004/0124553 A1 Jul. 1, 2004

Related U.S. Application Data

(60) Provisional application No. 60/423,771, filed on Nov. 5, 2002.

(51) Int. Cl.
*B29C 44/06* (2006.01)
(52) U.S. Cl. ............... 264/46.5; 264/46.6; 264/50; 264/53
(58) Field of Classification Search ............. 264/46.5, 264/46.6, 50, 53
See application file for complete search history.

(56) References Cited

U.S. PATENT DOCUMENTS

| | | |
|---|---|---|
| 3,615,974 A | 10/1971 | Graff |
| 4,399,174 A | 8/1983 | Tanaka et al. |
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,810,548 A | 3/1989 | Ligon, Sr. et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A * | 2/1990 | Kitoh et al. .......... 156/79 |
| 4,922,596 A | 5/1990 | Wycech |
| 4,923,902 A | 5/1990 | Wycech |
| 4,978,562 A | 12/1990 | Wycech |
| 5,102,188 A | 4/1992 | Yamane |
| 5,124,186 A | 6/1992 | Wycech |
| 5,194,199 A | 3/1993 | Thum |
| 5,266,133 A | 11/1993 | Hanley et al. |
| 5,358,397 A | 10/1994 | Ligon et al. |
| 5,506,025 A | 4/1996 | Otto et al. |
| 5,529,824 A | 6/1996 | Walendy et al. |
| 5,575,526 A | 11/1996 | Wycech |
| 5,642,914 A | 7/1997 | Takabatake |
| 5,660,116 A | 8/1997 | Dannawi et al. |
| 5,725,272 A | 3/1998 | Jones |
| 5,755,486 A | 5/1998 | Wycech |
| 5,766,719 A | 6/1998 | Rimkus |
| 5,804,608 A | 9/1998 | Nakazato et al. |

(Continued)

FOREIGN PATENT DOCUMENTS

DE   29 19 046   11/1980

(Continued)

OTHER PUBLICATIONS

Copending U.S. Appl. No. 09/631,211, filed Aug. 3. 2000.

(Continued)

*Primary Examiner*—Allan R. Kuhns
(74) *Attorney, Agent, or Firm*—Dobrusin & Thennisch PC

(57) ABSTRACT

A lightweight member is provided for reinforcing, sealing or baffling structures of articles of manufacture such as automotive vehicles. The lightweight member preferably includes a carrier member having a cellular structure and an expandable material disposed thereon.

20 Claims, 2 Drawing Sheets

U.S. PATENT DOCUMENTS

| | | |
|---|---|---|
| 5,806,919 A | 9/1998 | Davies |
| 5,884,960 A | 3/1999 | Wycech |
| 5,888,600 A | 3/1999 | Wycech |
| 5,902,656 A | 5/1999 | Hwang |
| 5,904,024 A | 5/1999 | Miwa |
| 5,931,474 A | 8/1999 | Chang et al. |
| 5,932,680 A | 8/1999 | Heider |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |
| 6,093,358 A | 7/2000 | Schiewe et al. |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,169,122 B1 | 1/2001 | Blizard et al. |
| 6,189,953 B1 | 2/2001 | Wycech |
| 6,196,621 B1 | 3/2001 | VanAssche |
| 6,199,940 B1 | 3/2001 | Hopton et al. |
| 6,207,244 B1 | 3/2001 | Hesch |
| 6,231,942 B1 | 5/2001 | Blizard et al. |
| 6,233,826 B1 | 5/2001 | Wycech |
| 6,235,380 B1 | 5/2001 | Tupil et al. |
| 6,237,304 B1 | 5/2001 | Wycech |
| 6,244,601 B1 | 6/2001 | Buchholz et al. |
| 6,253,524 B1 | 7/2001 | Hopton et al. |
| 6,263,635 B1 | 7/2001 | Czaplicki |
| 6,267,436 B1 | 7/2001 | Takahara |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,284,810 B1 | 9/2001 | Burnham et al. |
| 6,287,666 B1 | 9/2001 | Wycech |
| 6,294,115 B1 | 9/2001 | Blizard et al. |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,322,347 B1 | 11/2001 | Xu |
| 6,332,731 B1 | 12/2001 | Wycech |
| 6,341,467 B1 | 1/2002 | Wycech |
| 6,347,799 B1 | 2/2002 | Williams et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,376,059 B1 * | 4/2002 | Anderson et al. ........ 428/314.8 |
| 6,379,059 B1 | 4/2002 | Kaplan |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,444,713 B1 | 9/2002 | Pachl et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B1 | 11/2002 | Barz |
| 6,474,723 B1 | 11/2002 | Czaplicki et al. |
| 6,475,577 B1 | 11/2002 | Hopton et al. |
| 6,478,367 B1 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B1 | 1/2003 | Schneider |
| 6,519,854 B1 | 2/2003 | Blank |
| 6,523,857 B1 | 2/2003 | Hopton et al. |
| 6,523,884 B1 | 2/2003 | Czaplicki et al. |
| 6,546,693 B1 | 4/2003 | Wycech |
| 6,550,847 B1 | 4/2003 | Honda et al. |
| 6,561,571 B1 | 5/2003 | Brennecke |
| 6,573,309 B1 | 6/2003 | Reitenbach et al. |
| 6,575,526 B1 | 6/2003 | Czaplicki et al. |
| 6,607,238 B1 | 8/2003 | Barz |
| 6,613,811 B1 | 9/2003 | Pallaver et al. |
| 6,619,727 B1 | 9/2003 | Barz et al. |
| 6,634,698 B1 | 10/2003 | Kleino |
| 6,641,208 B1 | 11/2003 | Czaplicki et al. |
| 6,668,457 B1 | 12/2003 | Czaplicki |
| 6,691,468 B1 | 2/2004 | Helferty |
| 6,692,347 B1 | 2/2004 | Schneider |
| 6,708,979 B1 | 3/2004 | Stratman et al. |
| 6,722,720 B1 | 4/2004 | Donick et al. |
| 6,729,425 B1 | 5/2004 | Schneider |
| 6,748,667 B1 | 6/2004 | Sevastian |
| 6,752,451 B1 | 6/2004 | Sakamoto |
| 6,777,049 B1 | 8/2004 | Sheldon et al. |
| 6,786,533 B1 | 9/2004 | Bock et al. |
| 6,793,274 B1 | 9/2004 | Riley et al. |
| 6,811,864 B1 | 11/2004 | Czaplicki et al. |
| 6,820,923 B1 | 11/2004 | Bock |
| 6,846,559 B1 | 1/2005 | Czaplicki et al. |
| 6,851,232 B1 | 2/2005 | Schwegler |
| 6,852,359 B1 | 2/2005 | Drath et al. |
| 6,855,652 B1 | 2/2005 | Hable et al. |
| 6,887,914 B1 | 5/2005 | Czaplicki et al. |
| 6,890,021 B1 | 5/2005 | Bock et al. |
| 6,905,745 B1 | 6/2005 | Sheldon et al. |
| 6,920,693 B1 | 7/2005 | Hankins et al. |
| 6,921,130 B1 | 7/2005 | Barz et al. |
| 6,923,499 B1 | 8/2005 | Wieber et al. |
| 6,928,736 B1 | 8/2005 | Czaplicki et al. |
| 6,932,421 B1 | 8/2005 | Barz |
| 6,938,947 B1 | 9/2005 | Barz et al. |
| 6,941,719 B1 | 9/2005 | Busseuil et al. |
| 6,953,219 B1 | 10/2005 | Lutz et al. |
| 6,955,593 B1 | 10/2005 | Lewis et al. |
| 2001/0042353 A1 | 11/2001 | Honda et al. |
| 2002/0053179 A1 | 5/2002 | Wycech |
| 2002/0066254 A1 | 6/2002 | Ebbinghaus |
| 2002/0074827 A1 | 6/2002 | Fitzgerald et al. |
| 2002/0160130 A1 | 10/2002 | Sheldon et al. |
| 2002/0164450 A1 | 11/2002 | Lupini et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0042056 A1 | 3/2003 | Schneider et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0144409 A1 | 7/2003 | Kassa et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |

| | | |
|---|---|---|
| 2003/0186049 A1 | 10/2003 | Czaplicki et al. |
| 2003/0201572 A1 | 10/2003 | Coon et al. |
| 2003/0218019 A1 | 11/2003 | Le Gall et al. |
| 2004/0011282 A1 | 1/2004 | Myers et al. |
| 2004/0018341 A1 | 1/2004 | Richardson et al. |
| 2004/0018353 A1 | 1/2004 | Czaplicki et al. |
| 2004/0031164 A1 | 2/2004 | Sevastian |
| 2004/0033344 A1 | 2/2004 | Czaplicki et al. |
| 2004/0034982 A1 | 2/2004 | Wieber et al. |
| 2004/0046423 A1 | 3/2004 | Wieber |
| 2004/0051251 A1 | 3/2004 | Hankins et al. |
| 2004/0056472 A1 | 3/2004 | Schneider |
| 2004/0074150 A1 | 4/2004 | Wycech |
| 2004/0079478 A1 | 4/2004 | Merz |
| 2004/0135058 A1 | 7/2004 | Wycech |
| 2005/0058787 A1 | 3/2005 | Ishikawa et al. |
| 2005/0081383 A1 | 4/2005 | Kosal et al. |
| 2005/0082111 A1 | 4/2005 | Weber |
| 2005/0102815 A1 | 5/2005 | Larsen |
| 2005/0126286 A1 | 6/2005 | Hable et al. |
| 2005/0126848 A1 | 6/2005 | Sivoshai et al. |
| 2005/0127145 A1 | 6/2005 | Czaplicki et al. |
| 2005/0159531 A1 | 7/2005 | Ferng |
| 2005/0166532 A1 | 8/2005 | Barz |
| 2005/0172486 A1 | 8/2005 | Carlson et al. |
| 2005/0194706 A1 | 9/2005 | Kosal et al. |
| 2005/0212326 A1 | 9/2005 | Marion |
| 2005/0212331 A1 | 9/2005 | Tsushima |
| 2005/0212332 A1 | 9/2005 | Sheldon et al. |
| 2005/0217785 A1 | 10/2005 | Hable et al. |
| 2005/0218697 A1 | 10/2005 | Barz et al. |
| 2005/0230165 A1 | 10/2005 | Thomas et al. |
| 2005/0241756 A1 | 11/2005 | Harthcock et al. |
| 2005/0249916 A1 | 11/2005 | Muto et al. |
| 2005/0249936 A1 | 11/2005 | Ui et al. |
| 2005/0251988 A1 | 11/2005 | Mendiboure |
| 2005/0260399 A1 | 11/2005 | Finerman |
| 2005/0269840 A1 | 12/2005 | Finerman et al. |
| 2005/0276970 A1 | 12/2005 | Busseuil et al. |

FOREIGN PATENT DOCUMENTS

| | | |
|---|---|---|
| DE | 3826011 A1 | 2/1990 |
| DE | 42 27 393 A1 | 3/1993 |
| DE | 196 35 734 A1 | 4/1997 |
| DE | 198 12 288 C1 | 5/1999 |
| DE | 198 56 255 C1 | 1/2000 |
| DE | 198 58 903 A1 | 6/2000 |
| EP | 0 453 777 A2 | 10/1991 |
| EP | 0 588 182 A2 | 3/1994 |
| EP | 0 679 501 A1 | 11/1995 |
| EP | 0 697 956 B1 | 2/1996 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 006 022 A2 | 6/2000 |
| EP | 1 134 126 B1 | 3/2001 |
| EP | 1 122 156 A2 | 8/2001 |
| EP | 1 031 496 B1 | 12/2001 |
| EP | 1 182 087 A2 | 2/2002 |
| EP | 0 893 332 B1 | 3/2002 |
| EP | 1 208 954 A2 | 5/2002 |
| EP | 1 256 512 A2 | 11/2002 |
| EP | 1 006 022 B1 | 9/2003 |
| EP | 1 362 683 A2 | 11/2003 |
| EP | 1 362 769 A1 | 11/2003 |
| EP | 1 428 744 | 6/2004 |
| EP | 1 475 295 | 11/2004 |
| EP | 1 591 224 | 2/2005 |
| FR | 2115177 | 7/1972 |
| FR | 2 749 263 | 12/1997 |
| GB | 2 375 328 A | 11/2002 |
| JP | 58-87668 | 6/1983 |
| JP | 63-231913 | 9/1988 |
| JP | 3-197743 | 8/1991 |
| JP | 4-158009 | 6/1992 |
| JP | 7-117728 | 5/1995 |
| JP | 7-31569 | 6/1995 |
| JP | 2001-62833 | 3/2001 |
| JP | 2001-88739 | 4/2001 |
| JP | 2001-199362 | 7/2001 |
| JP | 02001191949 A | 7/2001 |
| JP | 2002331960 | 11/2002 |
| JP | 2002-362412 | 12/2002 |
| WO | WO 95/32110 | 11/1995 |
| WO | WO 97/02967 | 1/1997 |
| WO | WO 97/43501 | 11/1997 |
| WO | WO 98/36944 | 8/1998 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 99/64287 | 12/1999 |
| WO | WO 00/03894 | 1/2000 |
| WO | WO 00/13958 | 3/2000 |
| WO | WO 00/27920 | 5/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO01/19667 | 3/2001 |
| WO | WO 01/54936 A1 | 8/2001 |
| WO | WO 01/68394 A2 | 9/2001 |
| WO | WO 01/71225 A1 | 9/2001 |
| WO | WO 01/83206 A1 | 11/2001 |
| WO | WO 01/88033 A1 | 11/2001 |
| WO | WO 02/055923 A2 | 7/2002 |
| WO | WO 03/042024 A1 | 5/2003 |
| WO | WO 03/047951 A1 | 6/2003 |
| WO | WO 03/051676 | 6/2003 |
| WO | WO 03/089221 A1 | 10/2003 |
| WO | WO 03/093387 | 11/2003 |
| WO | WO04/067304 | 8/2004 |
| WO | WO04/078451 | 9/2004 |
| WO | WO04/113153 | 12/2004 |
| WO | WO 05/077634 | 8/2005 |
| WO | WO05/080524 | 9/2005 |
| WO | WO 05/105405 | 11/2005 |
| WO | WO 05/113689 | 12/2005 |

OTHER PUBLICATIONS

Copending U.S. Appl. No. 10/628,973, filed Jul. 28, 2003.
Copending U.S. Appl. No. 10/646,439, filed Aug. 21, 2003.
Copending U.S. Appl. No. 10/635,064, filed Aug. 6, 2003.
Copending U.K. Application Serial No. 0220945.0 filed Sep. 10, 2002.
Copending U.S. Appl. No. 60/504,260, filed Sep. 18, 2003.
Copending U.S. Appl. No. 60/482,896, filed Jun. 26, 2003.
Klein, M. and Adam Opel AG, "Application of Structural Foam in the Body in White—Reinforcement Roof Rail Side of the OPEL ASTRA", VDI Berichte, pp. 227-249.
International Search Report Application No. PCT/US03/33411 dated Mar. 10, 2004.
MuCell Process News, Jun. 2002, pp. 1-4, vol. VIII.
Technical Papers and Presentations, excerpt from Trexel, Inc. website www.trexel.com/techpap.html, Oct. 9, 2002.
Trexel SII SCF System, excerpt from Trexel, Inc. website www.trexel.com/scf.html, Oct. 9, 2002.
Trexel, Inc. website home page, www.trexel.com/index.html.
Extrusion, excerpt from Trexel, Inc. website www.trexel.com/extrusio.html, Oct. 9, 2002.

MuCell Extrusion Technology, excerpt from Trexel, Inc. website www.trexel.com/extrtech.html, Oct. 9, 2002.

MuCell Capabilities, excerpt from Trexel, Inc. website www.trexel.com/extrcapab.html, Oct. 9, 2002.

Product Assessment & Services, excerpt from Trexel, Inc. website www.trexel.com/extrassess.html, Oct. 9, 2002.

Injection Molding, excerpt from Trexel, Inc. website www.trexel.com/injmold.html, Oct. 9, 2002.

MuCell Injection Molding Process, excerpt from Trexel, Inc. website www.trexel.com/improcess.html, Oct. 9, 2002.

MuCell Commercial Applications, excerpt from Trexel, Inc. website www.trexel.com/imapps.html, Oct. 9, 2002.

Mold Trials, excerpt from Trexel, Inc. website www.trexel.com/imtrials.html, Oct. 9, 2002.

Designing for MuCell, excerpt from Trexel, Inc. website www.trexel.com/imdesign.html, Oct. 9, 2002.

Technical Description, excerpt from Trexel, Inc. website www.trexel.com/techinfo.html, Oct. 9, 2002.

MuCell Processes Trexel Inc. PowerPoint Presentation, obtained since at least Oct. 9, 2002.

Born et al., Structural Bonding in Automotive Applications, (Apr. 2003).

Hopton et al., Application of a Structural Reinforcing Material to Improve Vehicle NVY Characteristics (1999).

Lilley et al., Comparison of Preformed Acoustic Baffles and Two-Component Polyurethane Foams for Filling Body Cavities, (2001).

Lilley et al., A Comparison of NVH Treatments for Vehicle Floorplan Applicstions (2001).

Lilley et al., Vehicle Acoustic Solutions, (2003).

Mansour et al., Optimal Bonding Thickness for Vehicle Stiffness, (2001).

* cited by examiner

LIGHTWEIGHT MEMBER FOR REINFORCING, SEALING OR BAFFLING

CLAIM OF BENEFIT OF FILING DATE

The present application claims the benefit of the filing date of U.S. Provisional Application Ser. No. 60/423,771, filed Nov. 5, 2002, hereby incorporated by reference.

TECHNICAL FIELD

The present invention relates to a lightweight member, which is employed for providing reinforcing, sealing, baffling, combinations thereof or the like to a structure of an article of manufacture such as an automotive vehicle.

BACKGROUND

For many years, industries such as the transportation industry have been innovatively designing members for enhancing structural reinforcement, damping, sealing, baffling, thermal insulation and acoustic absorption characteristics of articles such as furniture, buildings and transportation vehicles (e.g., automotive vehicles, boats, trains, busses, airplanes or the like). Design of such members can involve several different considerations, and these considerations may need to be balanced against one another to achieve a desired result. Examples of such considerations include, without limitation, strength, weight, and cost of the members. Other considerations include compatibility of the members with articles of manufacture, ease of assembling the members to articles of manufacture, ability of the members to provide desired levels of damping, reinforcement or sealing or other like considerations.

In the interest of continuing such innovation, the present invention provides an improved member suitable for providing baffling, sealing, reinforcing, a combination thereof or the like to a structure of an article of manufacture.

DETAILED DESCRIPTION OF THE INVENTION

Figure 1:
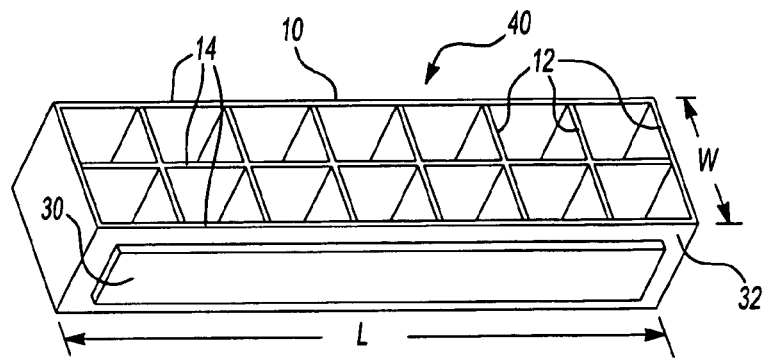
FIG. 1 illustrates an exemplary reinforcement member formed in accordance with an aspect of the present invention.

The present invention is predicated upon an improved process for forming reinforcement members, and articles incorporating the same. Although it is contemplated that the reinforcement member may be employed in a variety of articles of manufacture, for exemplary purposes, the reinforcement member is discussed herein as being employed in an automotive vehicle. The process for forming the reinforcement member and for applying the reinforcement to an automotive vehicle preferably includes one or a combination of the following steps:

i) providing a polymeric material such as a polyamide;
ii) molding the polymeric material to form a carrier member with a cellular (e.g., a microcellular) structure;
iii) applying an expandable material to a surface of the carrier member for forming the reinforcement member;
iv) placing the reinforcement member within a cavity of an automotive vehicle, the cavity being defined by one or more walls of a structure of the automotive vehicle; and
v) activating the expandable material to form a structural foam that is adhered to the carrier member and the one or more walls of the structure of the automotive vehicle.

Polymeric Material for the Carrier Member

The polymeric material for the carrier member may include any polymer such as a plastic, an elastomer, a thermoplastic, a thermosettable polymer, a combination thereof or the like. The polymeric material may also include one or more non-polymeric materials such as additives and fillers. In preferred embodiments, the polymeric material includes up to at least about 30% or more by weight thermoplastics, more preferably at least about 45% by weight thermoplastics and even more preferably at least about 60% by weight thermoplastics.

Exemplary thermoplastic materials suitable for the polymeric material of the carrier member include, without limitation, polypropylenes, ethylene copolymers and terpolymers, polyolefins, polyesters, nylons, polyamides, polysulfones, poly(butylene terephthalates), poly(ethylene terephthalates), polyvinylchlorides, chlorinated polyvinylchlorides, polyvinylidene fluorides, high or low density polyethylenes, ethylene/chlorotrifluoroethylenes, polyethylethyl ketones, combinations thereof or the like. It is contemplated that the polymeric materials may be filled (e.g., with fibers, minerals, clays, carbonates, combinations thereof or the like) or unfilled. According to one highly preferred embodiment, the polymeric material for the carrier member is formed of between about 60% and about 80% by weight polyamide or nylon, and more particularly, nylon 6 or nylon 6,6, which is preferably filled with between about 20% to about 40% by weight glass fibers or minerals. One exemplary nylon is sold under the tradename NYLENE (e.g., NYLENE 5133) and is commercially available from Custom Resins, P.O. Box 46, Henderson, Ky., 42420. Other nylons include mineral filled NYLENE 6140 and impact modified NYLENE 4114.

Molding the Polymeric Material into the Carrier Member

It is contemplated that the carrier member may be formed, shaped or both according to a variety of techniques such as extrusion or the like. It is preferable, however, for the carrier member to be formed or shaped via a molding process such as injection molding, blow molding or the like. In a highly preferred embodiment, the carrier member is molded such that it has a cellular structure, which may be internal, external or both. Examples of molding processes, which provide cellular structures in polymers are disclosed in U.S. Pat. Nos. 6,379,059; 6,322,347; 6,294,115; 6,284,810; 6,235,380; 6,231,942; 6,169,122 all of which are expressly incorporated by reference for all purposes.

According to one preferred embodiment, the polymeric material of the present invention is injected molded, extruded, or otherwise molded according to a process, which preferably forms relatively small open or closed cells of substantially uniform size and shape (e.g., 1–100 microns is diameter) within the carrier member. According to the technique, a blowing agent is substantially completely dissolved in the polymeric material for forming a substantially single-phase substantially homogeneous solution. It is contemplated that chemical blowing agents may be employed such as azodicarbonamide, dinitrosopentamethylenetetramine, 4,4,-oxy-bis-(benzenesulphonylhydrazide), trihydrazinotriazine and N,N,-dimethyl-N,N,-dinitrosoterephthalamide, combinations thereof or the like. In a preferred embodiment, a physical blowing agent (e.g., a generally inert one) is dispersed (e.g., uniformly or selectively) within the polymeric material. Such a blowing is a typically a gas and in a highly preferred embodiment the gas is or includes either $N_2$, $CO_2$, a combination thereof or the like that is dissolved into the polymeric material at a sufficiently high temperature and at a sufficiently high pressure to maintain the gas in a supercritical state (e.g., as a supercritical fluid). In this manner, the blowing agent may be more uniformly dispersed within the polymeric material and may produce a finer cell structure (e.g., a microcellular structure).

When injection molding is employed, the solution of blowing agent and polymeric material is supplied (e.g., injected) into a mold of an injection molding apparatus. While it is contemplated that the polymeric material may be supplied to the mold prior to mixing the blowing agent and polymeric material to form the solution, it is preferable that the polymeric material and blowing agent be mixed to form the solution within the mold.

To form the carrier member, the temperature, the pressure, the solubility change rate, a combination thereof or the like of polymeric material and blowing agent are changed (e.g., reduced) such that the polymeric material becomes supersaturated with the blowing agent. In turn, the blowing agent rapidly nucleates within the solution creating the cellular or microcellular structure therein. Preferably, at the same time, the polymeric material of the solution is solidifying to form the carrier member with the cellular structure. Advantageously, the polymeric material, the molding technique or both together can assist in providing improved shaping or moldability of the carrier member.

Structurally, the carrier member may be formed in a variety of shapes and configurations depending upon the mold or technique employed to form the member. Exemplary configurations for carrier members are disclosed in U.S. patent application Ser. No. 09/502,686, filed Feb. 11, 2000, titled "Structural Reinforcement System for Automotive Vehicles", which is expressly incorporated herein by reference for all purposes. Further, it should be understood that the carrier member may be formed as part of a baffle, a reinforcement or a seal. Examples of configurations for seals, baffles and reinforcements are disclosed in U.S. patent application Ser. No. 60/482,896, titled Fastenable Member For Sealing, Baffling or Reinforcing and Method of Forming Same, filed Jun. 26, 2003; U.S. patent application Ser .No. 60/504,260, titled System and Method Employing a Porous Container for Sealing, Baffling or Reinforcing, filed Sep. 18, 2003; or U.S. patent application Ser. No. 10/464,251 titled System and Method for Sealing, Baffling or Reinforceing, filed Jun. 18, 2003; all of which are expressly incorporated herein by reference for all purposes.

In a preferred embodiment, carrier member includes one or more ribs for lowering the weight of the carrier member and for improving the strength characteristics of the carrier member. Referring to FIG. 1, there is illustrated one exemplary carrier member 10 formed in accordance with the present invention. The carrier member 10 is shown as elongated and skeletal in nature. Preferably, the carrier member 10 includes a plurality of laterally extending ribs 12 spaced apart along a length (L) of the carrier member 10 and a plurality of longitudinally extending ribs 14 spaced apart along a width (W) of the carrier member 10. As shown, the ribs 12, 14 form a crisscross pattern for providing strength to the carrier member 10. In the illustrated embodiment, the ribs 12, 14 are substantially shaped as planar panels that are square or rectangular, however, it is contemplated that the ribs 12, 14 may be configured in a variety of shapes.

Figure 2:
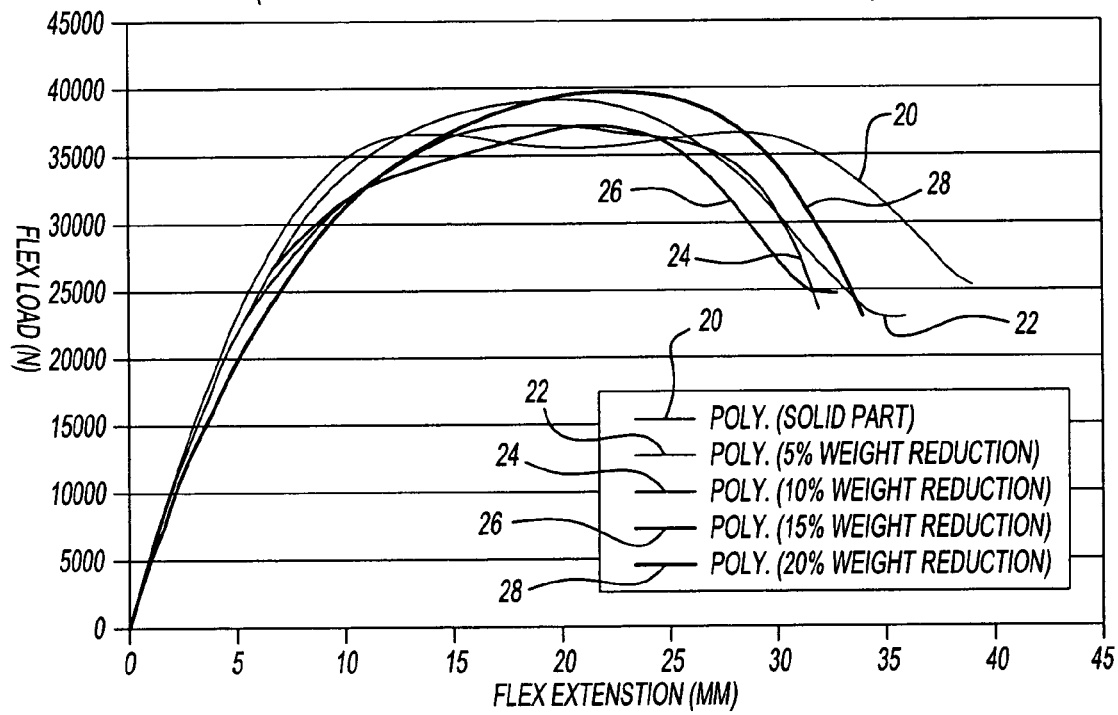
FIG. 2 illustrates an exemplary graph of experimental testing data for carrier members formed in accordance with an aspect of the present invention.

Advantageously, it has been found that carrier members molded to have cellular characteristics in accordance with the present invention exhibit acoustic, sealing, strength and stiffness characteristics similar to carrier members having substantially identical shapes and configurations, but which are non-cellular or are formed of internally continuous or solid materials. Referring to FIG. 2, a graph is illustrated with five lines 20, 22, 24, 26, 28, which correspond to five carrier members having a substantially identical shape and which include a rib construction such as that of the carrier member 10 of FIG. 1. In FIG. 2, the first line 20 corresponds to an internally solid or non-cellular carrier member. The second line 22, the third line 24, the fourth line 26 and the fifth line 28 correspond to carrier members, which have been formed with cellular structures according to the present invention and which, as a result, have respective reduced weights of 3%, 5%, 10%, 15% and 20% compared to the internally solid carrier member. For testing, each of the five carrier members was exposed to a load and, as can be seen, the lighter weight carrier members advantageously performed substantially as well as the heavier carrier members and particularly the internally solid member. Thus, it can be seen that carrier members, and particularly carrier members having rib constructions, can be reduced in weight up to 5%, 10%, 15%, 20% or more over an internally solid part while still retaining a substantial portion of their strength.

Applying Expandable Material to the Carrier Member to Form a Reinforcement Member When used in automotive vehicles or other articles of manufacture, it is preferable for an expandable material to be applied to the carrier member of the invention for forming a reinforcement member. In FIG. 1, an expandable material 30 is disposed upon an outer surface 32 of one of the longitudinal ribs 14 of the carrier member 10 for forming a reinforcement member 40. It is contemplated, however, that the expandable material may be placed upon any surface of any carrier member formed in accordance with the present invention.

The expandable material 30 may be formed of several different materials. Generally speaking, the member 40 may utilize technology and processes for the forming and applying the expandable material 30 such as those disclosed in U.S. Pat. Nos. 4,922,596, 4,978,562, 5,124,186, and 5,884, 960 and commonly owned, co-pending U.S. application Ser. No. 09/502,686 filed Feb. 11, 2000 and Ser. No. 09/524,961 filed Mar. 14, 2000, all of which are expressly incorporated by reference for all purposes. Preferably, the expandable material 30 is formed of a high compressive strength and stiffness heat activated reinforcement material having foamable characteristics. The material may be generally dry to the touch or tacky and can be placed upon the carrier member 10 or the like in any form of desired pattern, placement, or thickness, but is preferably of substantially uniform thickness. One exemplary expandable material is L-5204 structural foam available through L&L Products, Inc. of Romeo, Mich.

Though other heat-activated materials are possible for the expandable material 30, a preferred heat activated material is an expandable polymer or plastic, and preferably one that is foamable. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208, L5209. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member 10 through fastening means which are well known in the art.

While the preferred materials for fabricating the expandable material 30 have been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the expandable material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207 and L5208, which are commercially available from L & L Products, Romeo, Mich.

In applications where the expandable material 30 is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the expandable material 30 may be increased to as high as 1500 percent or more. Typically, strength and stiffness are obtained from products that possess low expansion.

Some other possible materials for the expandable material 30 include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the expandable material 30 is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

It is contemplated that the material of the expandable material 30 could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of a baffle technology; a die-cast application according to teachings that are well known in the art; pumpable application systems which could include the use of a baffle and bladder system; and sprayable applications.

Installing the Reinforcement Member to an Automotive Vehicle

Once completed, the reinforcement member of the present invention is preferably installed to an automotive vehicle although it may be employed for other articles of manufacture such as boats, buildings, furniture, storage containers or the like. The reinforcement member may be used to reinforce a variety of components of an automotive vehicle including, without limitation, body components (e.g., panels), frame components (e.g., hydroformed tubes), pillar structures (e.g., A, B or C-pillars), bumpers, roofs or the like of the automotive vehicle.

In one preferred embodiment, the reinforcement member is placed at least partially within a cavity of a component of an automotive vehicle wherein the cavity is defined by one or more walls or surfaces of the component. Thereafter the expandable material is activated to expand, wet, and adhere to one or more surfaces of the carrier member and one or more surfaces of the component of the automotive vehicle. Upon curing, the expandable material preferably forms a rigid structural foam securing the reinforcement member within the cavity of the component of the vehicle thereby reinforcing the component.

Figure 3:
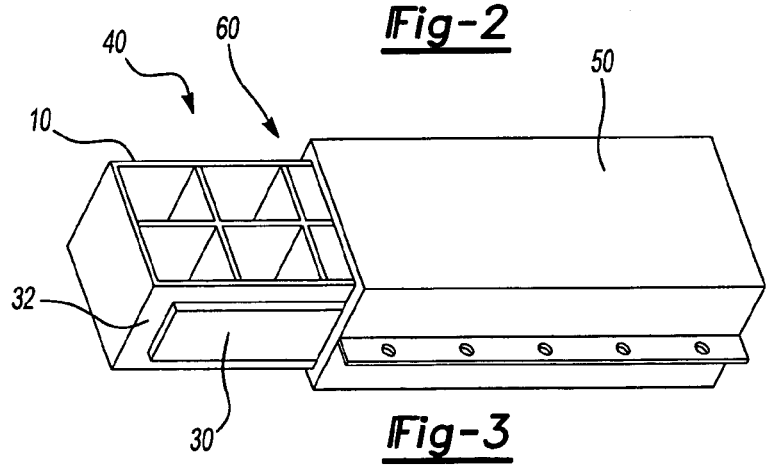
FIG. 3 illustrates an exemplary application of the reinforcement member of FIG. 1 to a component of an automotive vehicle in accordance with an aspect of the present invention.

According to one exemplary embodiment shown in FIG. 3, there is illustrated the exemplary reinforcement member 40 that includes the carrier member 10 with the expandable material 30 disposed thereon. As shown, the reinforcement member 40 is suitable for placement adjacent to a structural member 50 (e.g., a pillar structure) or within a cavity 60 of the structural member 50, which is preferably a component of an automotive vehicle. In the embodiment shown, the structural member 50 has a generally rectangular cavity 60 corresponding to the configuration of the carrier member 10, the reinforcement member 40 or both. However, it shall be understood that the structural member 50 may be formed in nearly any shape or configuration depending upon the intended use of the member 50 and depending upon other factors.

Alternative Members

In one alternative embodiment, it has been found that a cellular carrier member according to the present invention can be particularly useful for forming a baffle. Advantageously, such a cellular carrier member can form a lower weight baffle without significantly reducing sound absorption/attenuation characteristics or sealing characteristics of the baffle relative to a substantially identical baffle formed with a non-cellular carrier. As will be recognized, such a carrier member may be formed using any of the above described techniques. Although such baffles may be employed by themselves, it has been further found that these baffles may be employed in conjunction with a reinforcement member such as those discussed or shown. Advantageously such a baffle/reinforcement combination can quite effectively provide a structure of an automotive vehicle or other article with sound absorption/attenuation, sealing, structural reinforcement, a combination thereof or the like.

Figure 4:
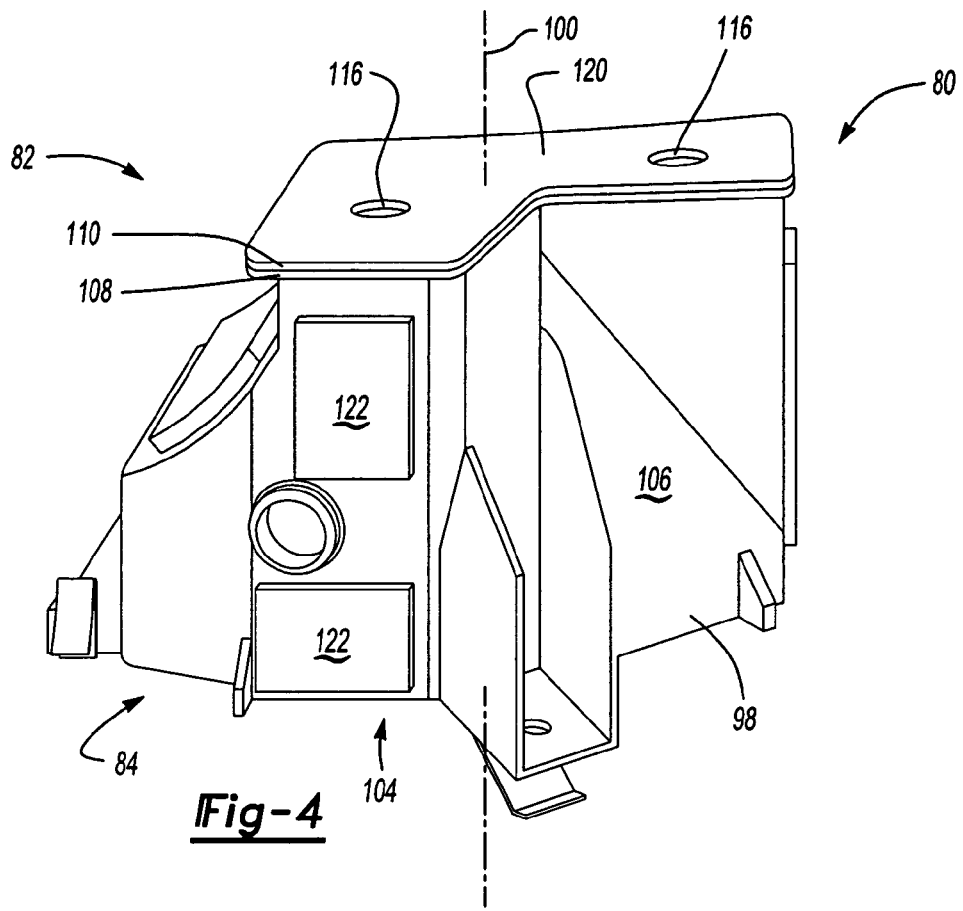
FIG. 4 illustrates another exemplary member formed in accordance with the present invention.
Figure 5:
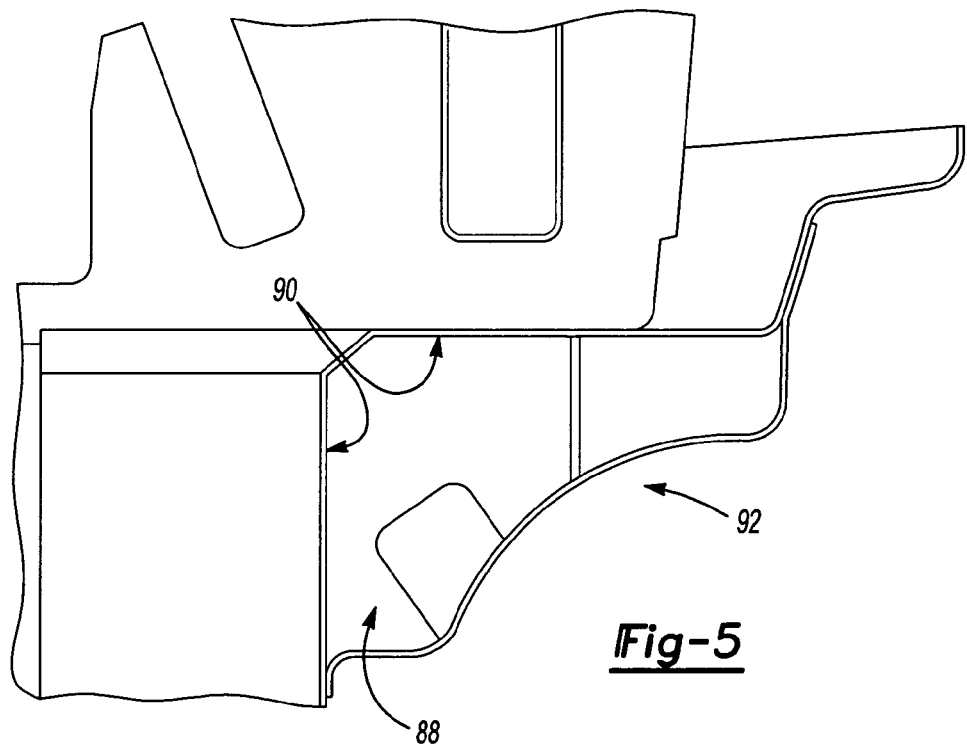
FIG. 5 illustrates a structure having a cavity suitable for receiving the member of FIG. 4.

Referring to FIG. 4, there is illustrated a combined baffle/reinforcement 80 having a baffle 82 combined with (e.g., attached to) a structural reinforcement member 84. The baffle/reinforcement 80 illustrated in FIG. 4 is configured for insertion into a cavity 88 defined by internal walls 90 of a structure 92 of an article of manufacture. In the embodiment shown, the structure 92 is a D-pillar of an automotive vehicle, however, in alternative embodiments, the structure may be any of those discussed herein.

The reinforcement member 84 illustrated includes a carrier member 98 that extends along a central axis 100. As shown, the carrier member 98 is shaped as a hollow shell with an internal surface defining an internal cavity 104 and an external surface 106 that is shaped to substantially correspond to the walls 90 of the structure 92. Of course, it is contemplated that the carrier member may be shaped in a variety of configurations as discussed herein and may additionally include components such as ribs or the like.

The carrier member 98 of the reinforcement member 84 may be formed of any of the materials, particularly the polymeric materials for the carrier member, discussed herein. In one embodiment, the carrier member 98 is formed of one of the cellular polymeric materials (e.g., cellular nylon) discussed herein. In another embodiment, the carrier member 98 is formed of sheet molding compound (SMC).

The baffle 82 also includes a carrier member 108. As shown, the carrier member 108 is substantially planar and L-shaped. The carrier member 108 is illustrated as being skew or substantially perpendicular to the axis 100 of the reinforcement member 84. The carrier member 108 also includes an outer peripheral edge 110 extending substantially continuously about the carrier member 108 and the carrier member 108 is substantially continuous within the area defined by the peripheral edge 110, although not required. Preferably, the peripheral edge 110 is shaped to correspond to (e.g., be continuously adjacent) the walls 90 of the structure 92 upon insertion of the baffle/reinforcement 80 into the cavity 88. It should be understood that, although the shape of the carrier member 108 has been specifically described, the carrier member 108 of the baffle 82 could also be shaped in a variety of configurations alternative to that shown and discussed.

The carrier member 108 of the baffle 82 may also be formed of any of the materials, particularly the polymeric materials for the carrier member, discussed herein. In one embodiment, the carrier member 108 is formed of one of the cellular polymeric materials (e.g., cellular nylon) discussed herein. Of course, the carrier member 108 may be formed of alternative non-cellular materials.

The baffle 82 may be attached to the reinforcement member 84 or they may be unattached, but employed adjacent to each other. As discussed, it is also possible to employ the baffle 82 and the reinforcement 84 separately. In the embodiment shown, the baffle 82 is attached to the reinforcement member 84 with one or more mechanical fasteners 116, but other fasteners such as adhesives, magnets or the like may be employed and the fasteners may or may not be integrally formed with the reinforcement member 84 and/or the baffle 82.

Both the carrier member 108 of the baffle 82 and the carrier member 98 of the reinforcement member 84 respectively have masses 120, 122 of expandable material disposed thereon. The reinforcement member 84 has a plurality of masses 122 of expandable material disposed upon various portions of the outer surface 106 of the member 84. The baffle 82, on the other hand, includes one substantially continuous mass 120 of expandable material. It is contemplated, however, that the single mass may be divided into or replaced by multiple masses. In the embodiment depicted, the mass 120 overlays the carrier member 108 of the baffle 82 and is substantially planar and coextensive therewith. The mass 120 also extends substantially continuously adjacent the peripheral edge 110 of the carrier member 108.

The expandable material on the baffle 82 and the expandable material on the reinforcement 84 may be any of the expandable materials discussed herein. Moreover, the expandable material on the baffle 82 and the expandable material on the reinforcement 84 may be the same, but are preferably different. In particular, the expandable material associated with the baffle 82 is preferably configured to volumetrically expand to at least about 350%, more preferably at least about 600% and still more preferably at least about 1000% relative to its original unexpanded volume while the expandable material associated with the reinforcement member 84 is preferably configured to volumetrically expand between about 10% and about 800%, more preferably between about 30% and about 400% and even more preferably between about 100% and about 300% relative to its original unexpanded volume.

The baffle 82 and the reinforcement member 84 of baffle/reinforcement 80 may be inserted within the cavity 88 of the structure 92 separately or as a unit. Upon insertion, the outer surface 106 of the carrier member 98 of the reinforcement member 84 and the peripheral edge 110 of the carrier member 108 of the baffle 82 are preferably continuously adjacent and substantially opposing the walls 90 defining the cavity 88. It should be understood that various supports or fasteners such as mechanical fasteners, adhesives, magnets, combinations thereof or the like, which may be integral with or attached to the baffle, the reinforcement member or both and may be utilized to assist in locating the baffle or the reinforcement member alone or as a combination within the cavity at least until the expandable material is expanded and cured.

After insertion, the masses 120, 122 of expandable material are preferably activated to expand, contact and wet the walls 90 of the structure 92 and cure to adhere the reinforcement member 84, the baffle 82 or both to the walls 90. Preferably, the mass 120 of expandable material of the baffle 82 substantially continuously spans a cross-section of the structure 92 for dividing the cavity 88 into at least two compartments that are substantially sealed against the passage of materials therebetween. Advantageously, the reinforcement member 84 provides structural integrity to the structure 92 while the baffle provides baffling, sealing, noise attenuation/damping, combinations thereof or the like to the structure 92.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A process for reinforcing, sealing or baffling a structure of an article of manufacture, the process comprising:
   providing a structure of an article of manufacture, the structure having one or more internal walls defining a cavity therein;
   molding a thermoplastic polymeric material to form a first carrier having a cellular structure wherein the molding process includes applying a sufficiently high temperature and sufficiently high pressure to the polymeric material for maintaining a gas within the polymeric material at a supercritical state;
   applying an expandable material upon the first carrier to form a member;
   inserting the member within the cavity of the structure; and
   activating the expandable material to expand, contact and wet the internal walls of the cavity and then to cure and adhere the member within cavity.

2. A process as in claim 1 wherein the member is substantially planar and is configured as a baffle.

3. A process as in claim 2 wherein the first carrier includes a peripheral edge that is substantially continuously adjacent to the one or more internal walls of the cavity upon insertion of the member in the cavity.

4. A process as in claim 3 wherein the expandable material, upon expansion, substantially continuously spans a cross-section of the structure for dividing the cavity into at least two compartments that are substantially sealed against the passage of materials therebetween.

5. A process as in claim 1 wherein the member is configured as a reinforcement for the structure.

6. A process as in claim 5 where the first carrier has a length and at least one rib extending transversely relative to the length and at least one rib extending longitudinally relative to the length.

7. A process as in claim 1 wherein the polymeric material includes a polyamide.

8. A process as in claim 7 wherein the polymeric material includes a nylon.

9. A process as in claim 8 wherein the polymeric material weighs at least 10% less than the same polymeric material in a non-cellular condition.

10. A process as in claim 9 wherein the polymeric material is about 60% to about 80% by weight nylon filled with about 20% to about 40% by weight glass fibers.

11. A process as in claim 1 wherein the step of molding the polymeric material includes supersaturating the polymeric material with blowing agent such that the blowing agent nucleates within the polymeric material to create the cellular structure within the first carrier.

12. A process for reinforcing, sealing or baffling a structure of an automotive vehicle, the process comprising:
providing a structure of an automotive vehicle, the structure having one or more internal walls defining a cavity therein;
molding a thermoplastic polymeric material to form a first carrier having a cellular structure wherein
  i) the molding process includes supersaturating the polymeric material with blowing agent such that the blowing agent nucleates within the polymeric material to create a cellular structure within the first carrier;
  ii) the thermoplastic polymeric material includes nylon; and
  iii) the polymeric material weighs at least 3% less than the same polymeric material in a non-cellular condition.
applying an expandable material upon the first carrier to form a member;
inserting the member within the cavity of the structure; and
activating the expandable material to expand, contact and wet the internal walls of the cavity and then to cure and adhere the member within cavity.

13. A process as in claim 12 wherein the member is substantially planar and is configured as a baffle.

14. A process as in claim 13 wherein the first carrier includes a peripheral edge that is substantially continuously adjacent to the one or more internal walls of the cavity upon insertion of the member in the cavity.

15. A process as in claim 14 wherein the expandable material, upon expansion, substantially continuously spans a cross-section of the structure for dividing the cavity into at least two compartments that are substantially sealed against the passage of materials therebetween.

16. A process as in claim 12 wherein the member is configured as a reinforcement for the structure.

17. A process as in claim 16 where the first carrier has a length and at least one rib extending transversely relative to the length and at least one rib extending longitudinally relative to the length.

18. A process for forming a reinforced and baffled structural assembly of an automotive vehicle, comprising:
providing a structure of an automotive vehicle wherein:
  i) the structure is a D-Pillar of the vehicle; and
  ii) the structure includes one or more walls defining a cavity therein;
molding a polymeric material to form a first carrier having a cellular structure wherein:
  i) the polymeric material is about 60% to about 80% by weight nylon filled with about 20% to about 40% by weight glass fibers; and
  ii) molding the polymeric material includes supersaturating the polymeric material with blowing agent such that the blowing agent nucleates within the polymeric material to create a cellular structure within the first carrier;
molding a polymeric material for form a second carrier member wherein:
  i) the second carrier member has a shape that at least partially corresponds the structure of the automotive vehicle;
positioning a first expandable material upon the first carrier to form a baffling member;
positioning a second expandable material upon the second carrier to form a reinforcing member;
disposing the baffling member and the reinforcing member within the cavity of the structure of the automotive vehicle;
expanding the expandable material of the reinforcing member to contact and adhere to the one or more walls of the structure of the automotive vehicle wherein:
  i) the expandable material of the reinforcing member expands volumetrically to between about 100% to about 300% its original volume; and
expanding the expandable material of the baffling member to contact and adhere to the one or more walls of the structure of the automotive vehicle wherein:
  i) the expandable material of the baffling member expands volumetrically to at least about 350% its original volume.

19. A process as in claim 18 wherein the second carrier has a length and at least one rib extending transversely relative to the length and at least one rib extending longitudinally relative to the length.

20. A process as in claim 18 wherein the polymeric material of the first carrier weighs at least 10% less than the same polymeric material in a non-cellular condition.

* * * * *